United States Patent
Sharifi et al.

(10) Patent No.: US 12,260,858 B2
(45) Date of Patent: Mar. 25, 2025

(54) TRANSFERRING DIALOG DATA FROM AN INITIALLY INVOKED AUTOMATED ASSISTANT TO A SUBSEQUENTLY INVOKED AUTOMATED ASSISTANT

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 412 days.

(21) Appl. No.: 17/532,276

(22) Filed: Nov. 22, 2021

(65) Prior Publication Data

US 2023/0025709 A1    Jan. 26, 2023

Related U.S. Application Data

(60) Provisional application No. 63/224,250, filed on Jul. 21, 2021.

(51) Int. Cl.
*G10L 15/22* (2006.01)

(52) U.S. Cl.
CPC ........ *G10L 15/22* (2013.01); *G10L 2015/223* (2013.01)

(58) Field of Classification Search
CPC ... G10L 15/22; G10L 2015/223; G10L 17/00; G10L 17/04; G06F 3/167; G06F 16/90332; G06F 40/35
See application file for complete search history.

(56) References Cited

U.S. PATENT DOCUMENTS

| 10,204,627 | B2 * | 2/2019 | Nitz ........................ G10L 15/22 |
| 11,010,428 | B2 | 5/2021 | Lewis et al. |
| 11,133,003 | B2 | 9/2021 | Ni |

(Continued)

FOREIGN PATENT DOCUMENTS

| JP | 2017535823 | 11/2017 |
| JP | 2018511095 | 4/2018 |

(Continued)

OTHER PUBLICATIONS

European Patent Office; Invitation to Pay Additional Fees issued in Application No. PCT/US2021/063753; 10 bages; dated Apr. 7, 2022.

(Continued)

*Primary Examiner* — Michael N Opsasnick
(74) *Attorney, Agent, or Firm* — Gray Ice Higdon

(57) ABSTRACT

Systems and methods for providing dialog data, from an initially invoked automated assistant to a subsequently invoked automated assistant. A first automated assistant may be invoked by a user utterance, followed by a dialog with the user that is processed by the first automated assistant. During the dialog, a request to transfer dialog data to a second automated assistant is received. The request may originate with the user, by the first automated assistant, and/or by the second automated assistant. Once authorized, the first automated assistant provides the previous dialog data to the second automated assistant. The second automated assistant performs one or more actions based on the dialog data.

19 Claims, 10 Drawing Sheets

(56) References Cited

U.S. PATENT DOCUMENTS

| | | | | |
|---|---|---|---|---|
| 2015/0364129 | A1* | 12/2015 | Gonzalez-Dominguez | ............... G10L 15/005 704/251 |
| 2019/0095425 | A1* | 3/2019 | Galitsky | ............... G06F 40/295 |
| 2019/0361575 | A1* | 11/2019 | Ni | ............... G10L 15/22 |
| 2020/0111491 | A1* | 4/2020 | Guy | ............... G10L 15/30 |
| 2020/0184156 | A1* | 6/2020 | Badr | ............... G06F 40/35 |
| 2020/0327169 | A1* | 10/2020 | Lewis | ............... G06F 16/9558 |
| 2020/0342865 | A1* | 10/2020 | Davies | ............... G10L 15/22 |
| 2021/0043191 | A1* | 2/2021 | Chao | ............... G10L 15/32 |
| 2021/0072953 | A1* | 3/2021 | Amarilio | ............... G10L 15/22 |

FOREIGN PATENT DOCUMENTS

| | | |
|---|---|---|
| JP | 2020521164 | 7/2020 |
| JP | 2021520558 | 8/2021 |
| WO | 2018213323 | 11/2018 |
| WO | WO-2019143614 A1 * 7/2019 ....... G06F 16/90332 |
| WO | 2019209255 | 10/2019 |

OTHER PUBLICATIONS

European Patent Office; International Search Report and Written Opinion issued in Application No. PCT/US2021/063753; 14 pages; dated May 31, 2022.

Japanese Patent Office; Notice of Reasons for Rejection issued in Application No. 2023-536522; 9 pages; dated Sep. 9, 2024.

European Patent Office; Communication pursuant to Article 94(3) EPC issued in Application No. 21841150.2; 6 pages; dated Oct. 18, 2024.

* cited by examiner

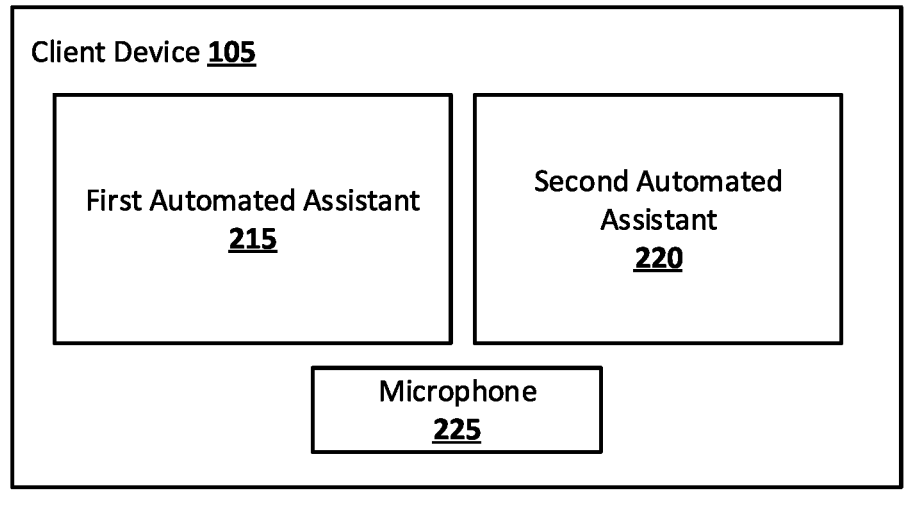
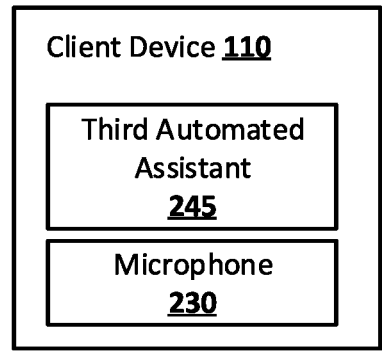
FIG. 2

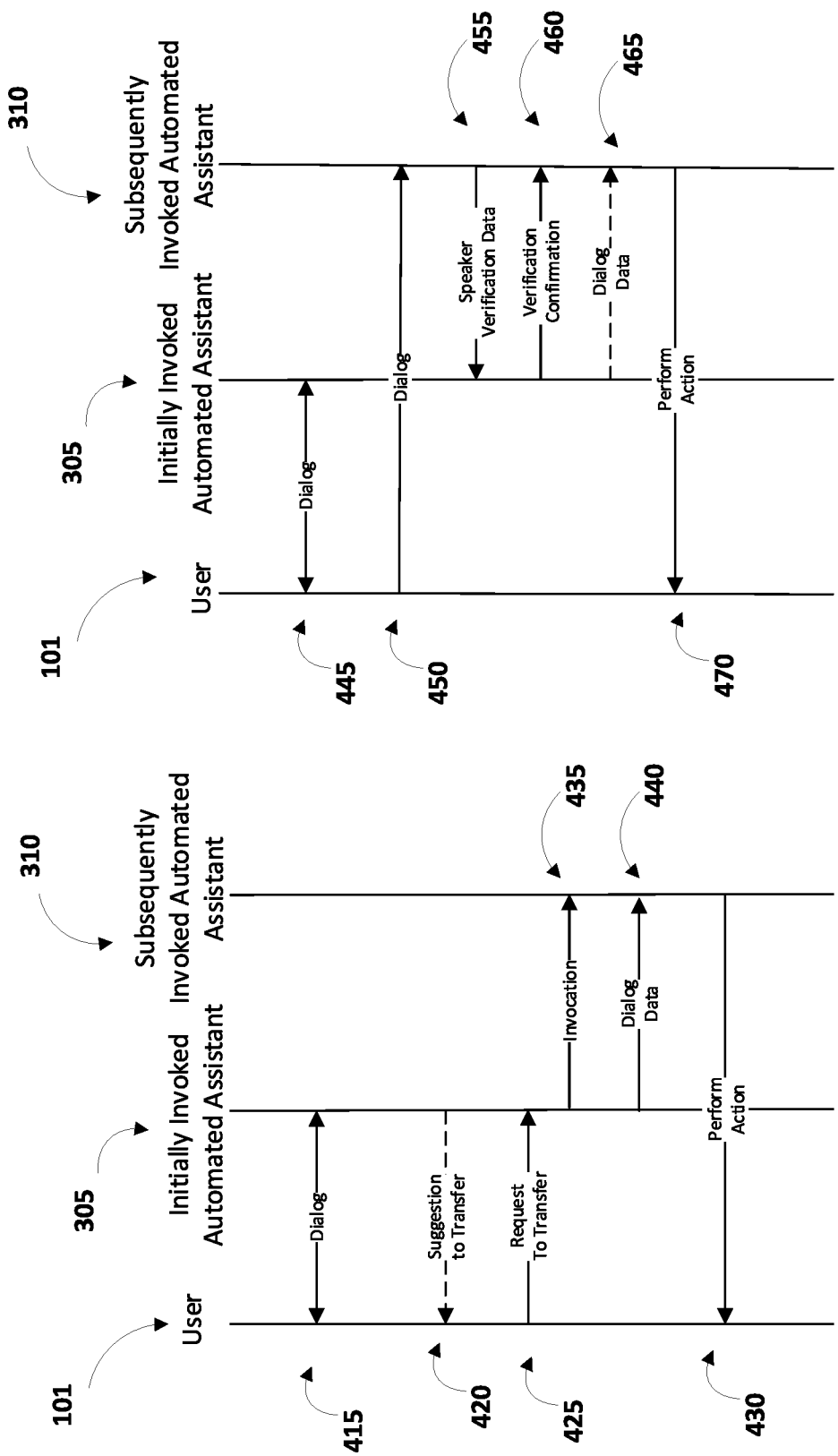

TRANSFERRING DIALOG DATA FROM AN INITIALLY INVOKED AUTOMATED ASSISTANT TO A SUBSEQUENTLY INVOKED AUTOMATED ASSISTANT

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant responds to a request by providing responsive user interface output, which can include audible and/or visual user interface output.

As mentioned above, many automated assistants are configured to be interacted with via spoken utterances that follow an invocation of the assistant. To preserve user privacy and/or to conserve resources, a user must often explicitly invoke an automated assistant before the automated assistant will fully process a spoken utterance. The explicit invocation of an automated assistant typically occurs in response to certain user interface input being received at a client device. The client device includes an assistant interface that provides, to a user of the client device, an interface for interfacing with the automated assistant (e.g., receives spoken and/or typed input from the user, and provides audible and/or graphical responses), and that interfaces with one or more additional components that implement the automated assistant (e.g., remote server device(s) that process user inputs and generate appropriate responses).

Some user interface inputs that can invoke an automated assistant via a client device include a hardware and/or virtual button at the client device for invoking the automated assistant (e.g., a tap of a hardware button, a selection of a graphical interface element displayed by the client device). Many automated assistants can additionally or alternatively be invoked in response to one or more spoken invocation phrases, which are also known as "hot words/phrases" or "trigger words/phrases". For example, a spoken invocation phrase such as "Hey Assistant," "OK Assistant", and/or "Assistant" can be spoken to invoke an automated assistant.

Often, a client device that includes an assistant interface includes one or more locally stored models that the client device utilizes to at least selectively monitor for an occurrence of a spoken invocation phrase. Such a client device can locally process received audio data utilizing the locally stored model, and discards any audio data that does not include the spoken invocation phrase. However, when local processing of received audio data indicates an occurrence of a spoken invocation phrase, the client device will then cause that audio data and/or following audio data to be further processed by the automated assistant. For instance, if a spoken invocation phrase is "Hey, Assistant", and a user speaks "Hey, Assistant, what time is it", audio data corresponding to "what time is it" can be processed by an automated assistant based on detection of "Hey, Assistant", and utilized to provide an automated assistant response of the current time. If, on the other hand, the user simply speaks "what time is it" (without first speaking an invocation phrase or providing alternate invocation input), no response from the automated assistant will be provided as a result of "what time is it" not being preceded by an invocation phrase (or other invocation input).

SUMMARY

Techniques are described herein for providing dialog data from a first automated assistant to a second automated assistant in response to a request to transfer the dialog data. For example, various techniques are directed to processing, by an initially invoked automated assistant, a dialog between a user and the initially invoked automated assistant, receiving a request to transfer processing of a query that is part of the dialog to a second automated assistant, and providing dialog data indicative of the dialog data to the second automated assistant for further processing. A user can initially invoke an automated assistant and utter one or more queries, to which the invoked automated assistant can generate responses. At some point in the dialog between the user and the initially invoked automated assistant, a request can be received that indicates that the user has interest in additional dialog and/or interest in a query being processed by a second automated assistant. The dialog and/or dialog data related to the dialog can be provided by the initially invoked automated assistant to the second assistant, which can perform one or more actions, such as processing the query to generate a response. In these and other manners, the second assistant can obtain the dialog and/or dialog data without having to engage in computationally burdensome dialog with the user. Further, the initially invoked automated assistant can guide the user-assistant dialog via selectively transferring the dialog and/or dialog data to the second assistant. Yet further, the second assistant can, in some implementations, generate a response that may not be able to be generated by the initially invoked automated assistant standing alone—thereby increasing robustness of the user-assistant dialog.

In some implementations, the user can utter an invocation phrase, such as "OK Assistant", that invokes a first automated assistant (herein also referred to as the "initially invoked automated assistant") but that does not explicitly invoke other automated assistant(s) with which the initially invoked automated assistant can at least selectively interact in processing a query received in association with (e.g., immediately following, immediately preceding) the invocation phrase. Thus, the user may specify, based on providing an invocation input that is specific to the initially invoked automated assistant, to utilize the initially invoked automated assistant rather than invoke one of the other automated assistant(s) individually. For example, a first invocation phrase(s) (e.g., "OK Assistant A") can, when detected, exclusively invoke a first automated assistant without invoking any other automated assistant(s). Likewise, a second invocation phrase(s) (e.g., "OK Assistant B"), when detected, can exclusively invoke a second automated assistant and without invoking the initially invoked automated assistant and/or any other automated assistant(s). The initially invoked assistant, when invoked, can at least selectively interact with other automated assistants (i.e., "secondary assistants") in processing input(s) provided in association with the invocation.

A user can invoke an automated assistant by uttering an invocation phrase that, once the automated assistant is initially invoked, may allow the user to carry on a dialog with the initially invoked automated assistant. The dialog can comprise one or more queries uttered by the user, followed by one or more responses generated by the initially invoked automated assistant. As an example, a user may initially invoke Assistant 1 by uttering "OK Assistant 1, what is a good movie for kids?" In this instance, "OK Assistant 1" can be a hotword that invokes a first automated assistant, which can generate and provide a response of "Movie A is a good movie for kids." In response, the user may utter additional queries, either related to the first query or unrelated queries, to generate a dialog between the initially invoked automated assistant and the user. For example, the user may utter the query of "What is another good movie" to be provided with additionally generated responses that are related to "good movies for kids" from the previous query. Also, for example, the user may next utter "What is the weather today," and the initially invoked automated assistant can provide a response that is unrelated to previous queries of the user and/or previous responses of the initially invoked automated assistant.

As another example, in response to the automated assistant responding with "Movie A is a good movie for kids," the user may follow up with the query "OK, play it on Streaming Service." In this instance, the automated assistant may determine an intent for the query, which can include determining what the user intended by the term "it," such as "Movie A," based on previous dialog between the user and the automated assistant. In response to the followup query of "Play it on Streaming Service," the initially invoked automated assistant can provide data to a streaming media application "Streaming Service" that can stream "Movie A" to the user via a user interface.

As yet another example, a user, once invoking the initially invoked automated assistant, can utter the phrase "What is the weather in San Francisco," and the initially invoked automated assistant can generate a response that is responsive to the query, such as "The weather today in San Francisco is 50 degrees and cloudy." In some instances, the dialog may include additional queries of the user that are related to previous queries. For example, a user may utter a followup query of "What about in Miami," indicating an intent to be provided with the weather in Miami. In response, the initially invoked automated assistant can respond with "The weather in Miami is 80 degrees and sunny." The dialog may continue between the user and the initially invoked automated assistant, both with related queries and with queries with unrelated intents.

In some implementations, multiple automated assistants can be present in the same environment. For example, a user may invoke an automated assistant that is executing on a device that is in proximity to a second device that is executing a second automated assistant. Also, for example, a user may invoke an automated assistant that is executing on a device that is also executing a second automated assistant. As previously described, the user may invoke the initially invoked automated assistant by uttering a hotword or phrase that activates the initially automated assistant but that does not invoke other automated assistants. For example, the user may utter the hotwords "OK Assistant 1" to invoke a first automated assistant that does not invoke a second automated assistant. Similarly, the user may utter the hotwords "OK Assistant 2" that invokes a second automated assistant without invoking the first automated assistant.

In some implementations, an automated assistant can provide an indication to other automated assistant(s) in the environment of types of queries and/or commands that the automated assistant is capable of handling. For example, an automated assistant can have access to a calendar application and, as a result, can provide an indication to other automated assistants that queries related to a user's calendar can be handled by that automated assistant. Also, for example, an automated assistant can indicate, via one or more signals to other automated assistant(s), that it is capable of streaming media via a media streaming application. Other automated assistants can be provided with information regarding the capabilities of the other automated assistants so that, in instances wherein the invoked automated assistant cannot process a query, it can be aware of other automated assistants in the same environment that may be capable of successfully processing the query and providing a response to the user. For example, one or more automated assistants can broadcast an ultrasonic signal that indicates the types of queries and/or types of applications that the broadcasting automated assistant is able to process. Also, for example, an automated assistant may provide indications of its capabilities via Wi-fi, an application programming interface (API), and/or other communication channels that allow an automated assistant to be made aware of the capabilities of other automated assistants in the environment.

In some implementations, an automated assistant may broadcast its capabilities preemptively. In those instances, when an initially invoked automated assistant receives a query that it is unable to process, it can search for other automated assistants that are broadcasting a capability to handle that type of request. Preemptive broadcasting of capabilities can reduce latency in determining to which second assistant (if any) to transfer a dialog and/or dialog data and, as a result, can lead to reduced latency in the second assistant generating a response. In some implementations, when an initially invoked automated assistant receives a request that it cannot process, it may broadcast a request to other automated assistants to determine whether the request can be handled by one or more other automated assistants. For example, an initially invoked automated assistant may receive a request related to a calendar application that it does not have access to, and can broadcast a message to other automated assistants that inquires as to whether the request can be handled by a different automated assistant. In response, an automated assistant that can handle the request can affirmatively respond, thus informing the initially invoked automated assistant that the request can be handled by that automated assistant.

In some instances, the initially invoked automated assistant may not be configured to generate a response to a query of a user. For example, the initially invoked automated assistant can receive a query from a user and process the query to generate a response that is responsive to the query. In a followup query, the initially invoked automated assistant may not generate a substantive response, such as when it is not configured to respond to the type of query uttered by the user and/or due to an explicit request, by the user, to pass generating a response to a different automated assistant. In those instances, the initially invoked automated assistant can transmit a portion of the previous dialog, or data representative of at least a portion of the previous dialog, to a second automated assistant for further processing. Based on the intention of the query and/or the previous dialog, the second automated assistant can generate a response and further perform one or more actions based on the generated response. For example, the second automated assistant, once it has been provided with dialog and/or dialog data from the previous dialog, can provide the user with an audible response, interact with an application, and/or perform other tasks based on the query.

In instances where the initially invoked automated assistant is not configured to respond to a query, the automated assistant can determine that another automated assistant may be more capable of fulfilling the query. For example, a user may utter the query "Play Movie A on Streaming Service." In instances where the initially invoked automated assistant may not have access to "Streaming Service," the initially invoked automated assistant can determine whether one or more other automated assistants are configured to handle such requests. For example, other automated assistants in the environment may broadcast an ultrasonic signal indicating its capabilities. For instance, an alternate automated assistant in the environment may have previously broadcasted its capabilities to the initially invoked automated assistant, which stored those capabilities (e.g., locally stored) in association with the alternate automated assistant. If a suitable second automated assistant is identified by the initially invoked automated assistant (e.g., by accessing the stored association of capabilities to the second automated assistant), a request to transfer the dialog data may be provided to the second automated assistant. Once the request has been granted by the second automated assistant, the initially invoked automated assistant can send the dialog that includes at least a portion of the dialog (e.g., intent of the dialog and/or query) to the second automated assistant. The second automated assistant can then process the query and perform one or more actions, such as initiating "Streaming Service" to provide Movie A to the user via a user interface.

In some implementations, the initially invoked automated assistant can provide a suggestion to the user to transfer dialog data to a second automated assistant. For example, a user may provide an initially invoked automated assistant with a query that the initially invoked automated assistant is unable to process or cannot otherwise provide a response that fulfills a request by the user. The initially invoked automated assistant can respond with a suggestion to the user that indicates another automated assistant may be configured to provide a response, such as "I don't know, would you like me to check with Assistant 2?" In response, the user can utter "Yes," the initially invoked automated assistant can provide Assistant 2 with dialog data, and processing may be further handled by Assistant 2. In this instance, the request to transfer (i.e., an utterance of "Yes") is provided directly by the user and invocation of the second automated assistant is provided by the initially invoked automated assistant.

In some implementations, a suggestion to transfer can be provided to the user based on identifying user preferences and determining that a query is of a type that the user has interest in being fulfilled by a different automated assistant. For example, the initially invoked automated assistant can determine that the user has previously utilized a different automated assistant to handle calendar-related queries, such as an automated assistant that has access to a calendar application of the user. When the initially invoked automated assistant receives, as part of a dialog, a request related to the calendar application, the initially invoked automated assistant can provide at least a portion of the dialog, and/or data indicative of the dialog, to the automated assistant that is preferred by the user to handle the request.

In some implementations, the request to transfer can be based on the preferences of the user. For example, a user can indicate, via one or more user preferences, that all queries related to a calendar application be handled by a first automated assistant. In instances where another automated assistant receives a query that is related to the calendar application, the invoked automated assistant can treat the user setting the user preference related to calendar queries as a request to transfer, to the first automated assistant, dialog for all queries related to the calendar application.

In some implementations, the user can continue a dialog with a second automated assistant after initially invoking a different automated assistant. For example, a user may invoke an automated assistant with "OK Assistant 1" and provide the query "What is the weather like in Miami?" The initially invoked automated assistant can respond to the query, such as "The weather is 75 and sunny." Subsequently, the user may utter "OK Assistant 2, how about in San Francisco," indicating that the user has interest in a second assistant (i.e., an automated assistant that is invoked with "OK Assistant 2") to further process the dialog. The initially invoked automated assistant can determine that the dialog includes a reference to the second automated assistant and provide the previous dialog data to the second automated assistant to allow the second automated assistant to determine context and/or intent of the query that is directed to it. For example, the query from the previous example does not explicitly include "What is the weather in San Francisco," but the intent of being provided with weather information may be included in the previous dialog based on the relation of the query to previous queries (i.e., "What is the weather in Miami").

In some implementations, a subsequently invoked automated assistant can determine that it does not have the context and/or intent of a conversation that is necessary to fulfill a query. For example, a user may invoke Assistant 1 and utter the query "What movie should I watch," to which Assistant 1 may respond with "Movie A is a good movie." The user may subsequently utter "OK Assistant 2, play it on Streaming Service." Because the name of the movie (i.e., "Movie A") is not part of the dialog with Assistant 2, Assistant 2 may request, from Assistant 1, the context, intent, and/or portions of the previous dialog with Assistant 1 such that Assistant 2 can determine what the user intended by the term "it" in the query "Play it on Streaming Service." Once Assistant 1 provides the context of the previous dialog, Assistant 2 can then determine that "it" refers to "Movie A" and initiate "Streaming Service" to play the requested movie.

In some implementations, verification of the speaker may be performed before an initially invoked automated assistant provides dialog data to a subsequently invoked automated assistant. For example, a user may utter "OK Assistant 1, what is a good movie to buy," and Assistant 1 may provide a response of "Movie A is highly rated." The user may subsequently utter "OK Assistant 2, buy it on Online Store." Assistant 2 can request a portion of previous dialog to determine the context of the query directed to Assistant 2, along with audio data that can include, for example, the user uttering "buy it on Online Store." Before providing Assistant 2 with the dialog data and/or context of the previous dialog, Assistant 1 may perform verification using the audio data from Assistant 2 to determine whether the speaker of the previous dialog is the same speaker that uttered "buy it on Online Store." For example, Assistant 1 can perform text independent speaker verification using one or more on-device models to generate a speaker vector to verify the speaker associated with the previous dialog. Alternatively or additionally, Assistant 1 can perform text dependent speaker verification (TDSV), by processing the audio data using an on-device TDSV model, to generate a speaker vector, and verify the speaker vector matches a speaker vector associated with the previous dialog. In instances where the speaker verification determines that the same speaker uttered the query to Assistant 2 as the previous dialog with Assistant 1, Assistant 1 can provide the dialog data as previously described. In instances where the speaker cannot be verified as the same speaker in both dialogs, Assistant 1 can provide an indication to Assistant 2 that the speaker is not the same and/or that additional dialog data is not available.

In some implementations, verification may include determining whether the query that is directed to the subsequently invoked automated assistant is a continuation of the previous dialog. For example, a dialog with the initially invoked automated assistant may include the user uttering "What is the weather in San Francisco," followed by a response from the initially invoked automated assistant. The user may subsequently utter "OK Assistant 2, what about in Miami," which is directed to the subsequently invoked automated assistant. The subsequently invoked automated assistant can provide at least a portion of the audio (or data indicative of the dialog and the speaker) to the initially invoked automated assistant. To verify, the initially invoked automated assistant can determine whether the utterance is related to one or more previous dialogs with the user before providing the dialog data to the subsequently invoked automated assistant. For example, the subsequently invoked automated assistant can send the audio data of the user uttering "What about in Miami" and the initially invoked automated assistant can determine that the utterance may be related to the context of the previous dialog regarding the weather in San Francisco.

Thus, utilization of techniques described herein mitigates the need of the user to explicitly invoke a second automated assistant when the initially invoked automated assistant is unable to fulfill a request or otherwise respond to a request from the user. This results in the overall duration of a dialog, by the user with the multiple automated assistants, being shortened and results in a corresponding reduction in usage of network and/or computational resources. Further, in instances where the initially invoked automated assistant is aware of another automated that would be more likely to return an objectively more complete response, the user can be made aware of the capabilities of the second automated assistant without requiring the user to invoke the second automated assistant to determine whether a more complete response can be obtained. Allowing a query to be passed off to a second automated assistant mitigates the need for the user to prolong a conversation with an automated assistant by assisting the user in receiving a response from the assistant most likely to affirmatively respond to a query without requiring the user to spend resources required to reinitiate a dialog with a second automated assistant. Further, by providing the dialog data to a second automated assistant obviates the need for the second assistant to prompt the user for information that has already been provided. Thus, context of a dialog can be provided without requiring the user to repeat information that has been provided to the first automated assistant.

The above description is provided as an overview of some implementations of the present disclosure. Further description of those implementations, and other implementations, are described in more detail below.

BRIEF DESCRIPTION OF THE DRAWINGS

FIG. 2 is a block diagram of an example environment in which various methods disclosed herein can be implemented.

FIG. 4A is a diagram illustrating transferring dialog data from a first automated assistant to a second automated assistant.

FIG. 4B is a diagram illustrating transferring a dialog from an initially invoked automated assistant to a subsequently invoked automated assistant after verifying the speaker.

DETAILED DESCRIPTION

Figure 1:
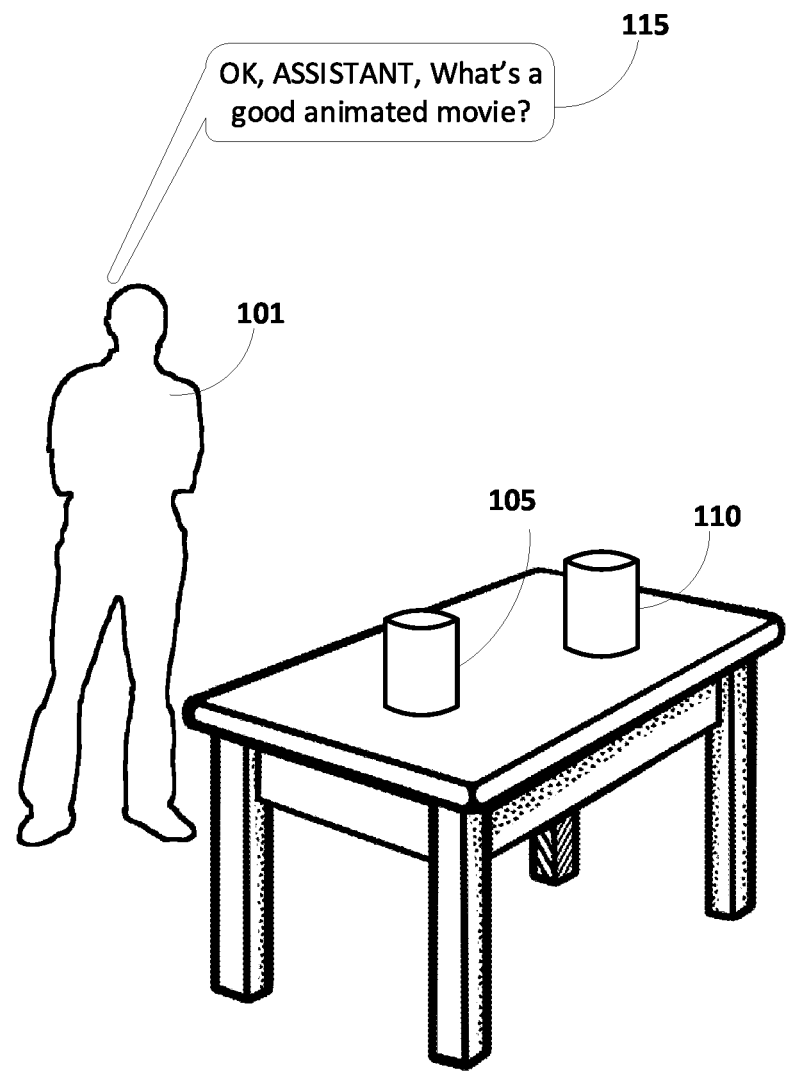
FIG. 1 is an illustration of an example environment in which implementations disclosed herein can be implemented.

Referring to FIG. 1, an example environment is provided which includes multiple automated assistants that may be invoked by a user 101. The environment includes a first standalone interactive speaker 105 with a microphone (not depicted) and a second standalone interactive speaker 110 with a microphone (also not depicted). The first speaker may be executing, at least in part, a first automated assistant that may be invoked with an invocation phrase. The second speaker 110 may be executing a second automated assistant that may be invoked with an invocation phrase, either the same invocation phrase as the first automated assistant or a different phrase to allow the user, based on the phrase uttered, to select which automated assistant to invoke. In the example environment, the user 101 is speaking a spoken utterance 115 of "OK Assistant, What's a good animated movie" in proximity to the first speaker 105 and the second speaker 110. If one of the first and/or second automated assistants is configured to be invoked by the phrase "OK Assistant," the invoked assistant may process the query that follows the invocation phrase (i.e., "What's a good animated movie").

In some implementations, a device, such as first speaker 105, may be executing multiple automated assistants. Referring to FIG. 2, an example environment is illustrated that includes multiple client devices executing multiple automated assistants. The system includes a first client device 105 that is executing a first automated assistant 215 and a second automated assistant 220. Each of the first and second automated assistants may be invoked by uttering an invocation phrase (unique to each assistant or the same phrase to invoke both assistants) proximate to the client device 105 such that the audio may be captured by a microphone 225 of client device 105. For example, user 101 may invoke the first automated assistant 215 by uttering "OK Assistant 1" in proximity to the client device 105, and further invoke the second automated assistant 220 by uttering the phrase "OK Assistant 2" in proximity to client device 105. Based on which invocation phrase is uttered, the user can indicate which of the multiple assistants that are executing on the client device 105 that the user has interest in processing a spoken query. The example environment further includes a second client device 110 that is executing a third automated assistant 245. The third automated assistant may be configured to be invoked using a third invocation phrase, such as "OK Assistant 3" such that it may be captured by microphone 230. In some implementations, one or more of the automated assistants of FIG. 2 may be absent. Further, the example environment may include additional automated assistants that are not present in FIG. 2. For example, the system may include a third device executing additional automated assistants and/or client device 110 and/or client device 105 may be executing additional automated assistants and/or fewer automated assistants than illustrated.

Each of the automated assistants 215, 220, and 245 can include one or more components of the automated assistant described herein. For example, automated assistant 215 may include its own speech capture component to process incoming queries, visual capture component to process incoming visual data, hotword detection engine, and/or other components. In some implementations, automated assistants that are executing on the same device, such as automated assistants 215 and 220, can share one or more components that may be utilized by both of the automated assistants. For example, automated assistant 215 and automated assistant 220 may share an on-device speech recognizer, on-device NLU engine, and/or one or more of the other components.

In some implementations, one or more automated assistants may share one or more modules, such as a natural language processor and/or the results of a natural language, US, and/or SU processor. For example, referring again to FIG. 2, both first automated assistant 215 and second automated assistant 220 may share natural language processing so that, when client device 105 receives audio data, the audio data is processed once into text that may then be provided to both automated assistants 215 and 220. Also, for example, one or more components of client device 105 may process audio data into text and provide the textual representation of the audio data to third automated assistant 245, as further described herein. In some implementations, the audio data may not be processed into text and may instead be provided to one or more of the automated assistants as raw audio data.

Figure 3:
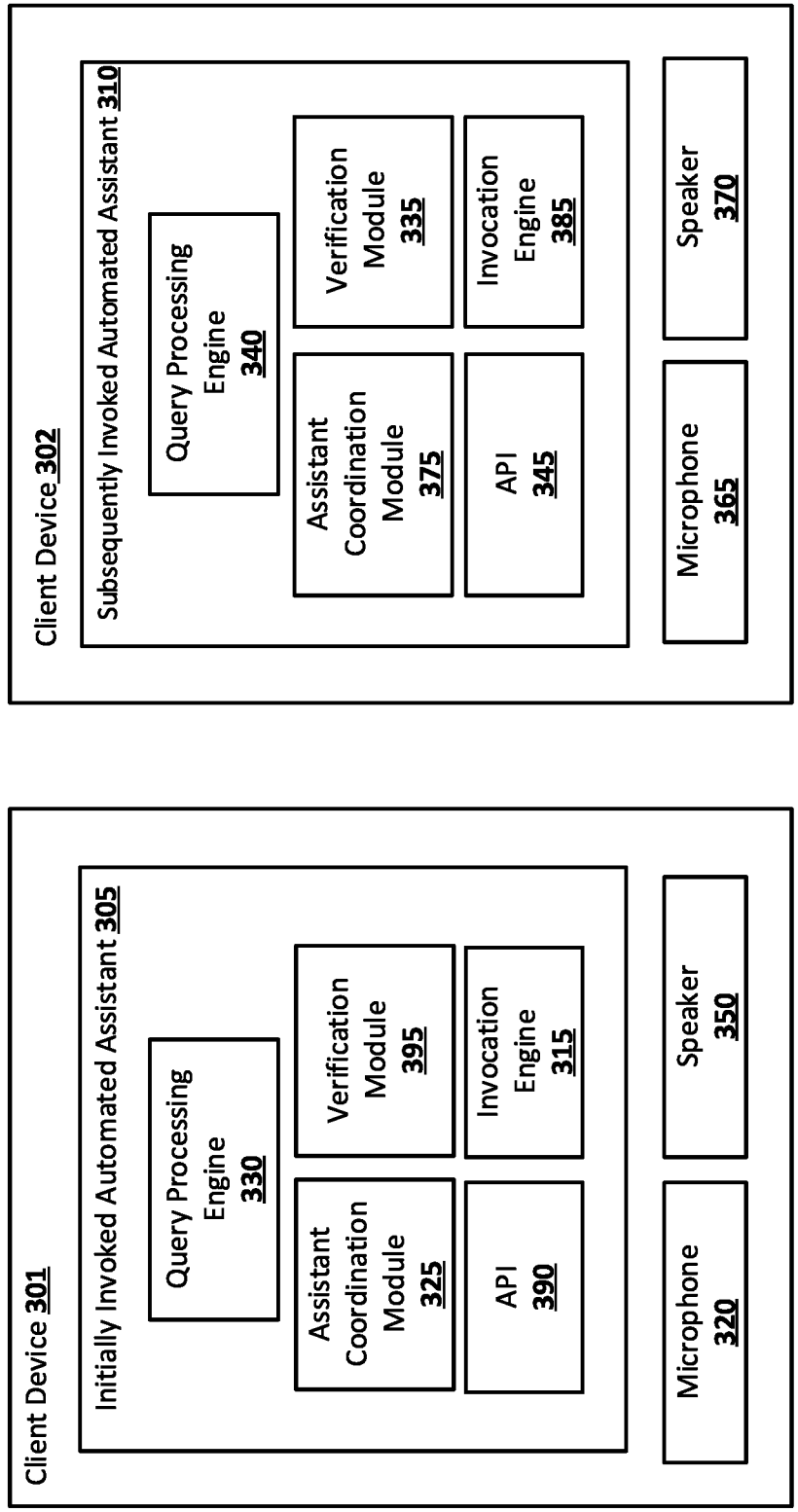
FIG. 3 is a block diagram of another example environment in which various methods disclosed herein can be implemented.

Referring to FIG. 3, an example of two automated assistants 305 and 310 is illustrated. As illustrated, initially invoked automated assistant 305 is executing on a first client device 301 and subsequently invoked automated assistant 310 is executing on a second client device 302. However, in some implementations, both automated assistants 305 and 310 can be executing on the same device, as illustrated in FIG. 2.

Initially invoked automated assistant 305 can be invoked by one or more phrases that are captured via microphone 320 and processed by invocation engine 315. In some implementations, initially invoked automated assistant 305 can be invoked by the user via one or more gestures that are captured by a camera (not shown) and processed by invocation engine 315. Invocation engine 315 can determine, based on the spoken utterance and/or gesture, whether the user has interest in utilizing initially invoked automated assistant 305. Similarly, subsequently invoked automated assistant 310 includes an invocation engine 385 that can determine whether the user, when uttering a phrase, has interest in interacting with subsequently invoked automated assistant 310 by similar phrases and/or gestures that are unique to the invocation of subsequently invoked automated assistant 310.

Initially invoked automated assistant 305 includes a query processing engine 330 that can process queries that are submitted by the user, such as by spoken utterance that is captured by microphone 320. In some implementations, a user may carry on a dialog with initially invoked automated assistant 305. For example, a user may submit a query of "What is the weather today," query processing engine 330 can generate a response, and the initially invoked automated assistant 305 can respond to the query with, for example, "it is sunny and 80 degrees today." The user may then submit an additional query that can be related to the previous query or unrelated to the previous query. For example, a user may submit a follow-up query of "What will it be tomorrow," indicating an interest in being provided with the weather tomorrow, and the query processing engine 330 can generate a response based on the dialog that has occurred with the user. In response, initially invoked automated assistant 305 can respond with an appropriate weather forecast. Also, for example, a user can submit an unrelated query of "What's a good movie to watch," which is unrelated to the previous query, and be provided with an appropriate response that is unrelated to previous queries.

In some implementations, a user may submit a query that initially invoked automated assistant 305 is unable to process. For example, a user may submit a query of "What's on my calendar today" to automated assistant 105, which may not have access to a calendar application of the user 101. In response, query processing engine 330 can provide a negative response, such as "I'm sorry, I don't have access to your calendar." In instances where this occurs, the user may be required to submit a query to subsequently invoked automated assistant 310, which may have access to the calendar of the user. If so, automated assistant 110 can provide a response, such as "You have a meeting at three today." In instances where the initially invoked automated assistant 305 and the subsequently invoked automated assistant 310 do not have access to the calendar application of the user, the user may further be required to invoke a different automated assistant or directly access a calendar application. Thus, computing resources are wasted, in those instances, in order for the user to determine which automated assistant is capable of providing the information of interest.

Referring to FIG. 4A, a diagram is provided that illustrates the flow of data between a user 101, an initially invoked automated assistant 305, and a subsequently invoked automated assistant 310. Initially, a dialog 415 can occur between the user 101 and the initially invoked automated assistant 305. For example, the user may utter one or more phrases that invokes initially invoked automated assistant 305, such as "OK Assistant A." The phrase can be a phrase that only invokes initially invoked automated assistant 305 and not subsequently invoked automated assistant 310.

In some instances, initially invoked automated assistant 305 may not be configured to handle a request of the user 101. In some implementations, initially invoked automated assistant 305 may suggest to the user to transfer the request to a subsequently invoked automated assistant 310. For example, the user 101 may submit a query of "Play that on Streaming Service" and initially invoked automated assistant 305 may not be configured and/or otherwise enabled to communicate with "Streaming Service." However, subsequently invoked automated assistant 310 may provide an indication, such as an ultrasonic signal broadcast by speaker 370 and captured by microphone 320, that it is configured to communicate with "Streaming Service." In those instances, the initially invoked automated assistant 305 can respond with a response, such as "I'm sorry, I can't do that. Would you like me to ask Assistant B," referring to subsequently invoked automated assistant 310. In some implementations, the suggestion may not be provided to the user 101. Instead, initially invoked automated assistant 305 may determine that the request to "Play that on Streaming Service" is a request to transfer the dialog to subsequently invoked automated assistant 310. Thus, in some instances, an affirmative response to a suggestion to transfer 420 (e.g., "Yes" in response to "Would you like me to have Assistant B do that") can be a request to transfer 425. Further, in instances where there is not a suggestion to transfer 420, the request of the user 101 to perform an action that initially invoked automated assistant 305 is not configured to perform can be a request to transfer (e.g., "Play that on Streaming Service"). Also, for example, a request for an automated assistant to perform an action that has been previously set as a user preference can be a request to transfer in instances when that action is requested.

Once the user 101 has requested a transfer and/or confirmed a suggestion to transfer, initially invoked automated assistant 305 can invoke 435 subsequently invoked automated assistant 310. In some implementations, initially invoked automated assistant 305 may communicate, via assistant coordination module 325 of initially invoked automated assistant 305, with one or more additional automated assistants that are executing on the same or different devices, such as via assistant coordination module 375 of subsequently invoked automated assistant 310. For example, initially invoked automated assistant 305 may be invoked by the user and assistant coordination module 325 may utilize one or more protocols, such as Wi-fi, Bluetooth, ultrasonic signal broadcast by client device 105 via speaker 350 and received by subsequently invoked automated assistant 302 via microphone 365, an API 390 and 345, and/or other communication channels.

After invocation of subsequently invoked automated assistant 310, initially invoked automated assistant 305 can transfer 440 at least a portion of the dialog data to subsequently invoked automated assistant 310. Dialog data may include audio data of the user uttering a request, which then may be further analyzed, via ASR and/or NLU, by subsequently invoked automated assistant 310. In some implementations, initially invoked automated assistant 305 may perform ASR and/or NLU and the dialog data may include a textual representation of the dialog and/or NLU output.

In response to being provided with the dialog data, query processing engine 340 can process the query and subsequently invoked automated assistant 310 can perform one or more actions 430 that are in response to the dialog data that was provided by initially invoked automated assistant 305. Actions can include, for example, accessing one or more applications, communicating with one or more other devices, performing a search, providing synthesized speech output, and/or other actions that subsequently invoked automated assistant 310 is configured to perform. Once the one or more actions are performed 430, the dialog can continue between the user and either the initially invoked automated assistant 305 and/or the subsequently invoked automated assistant 310.

Figure 5A:
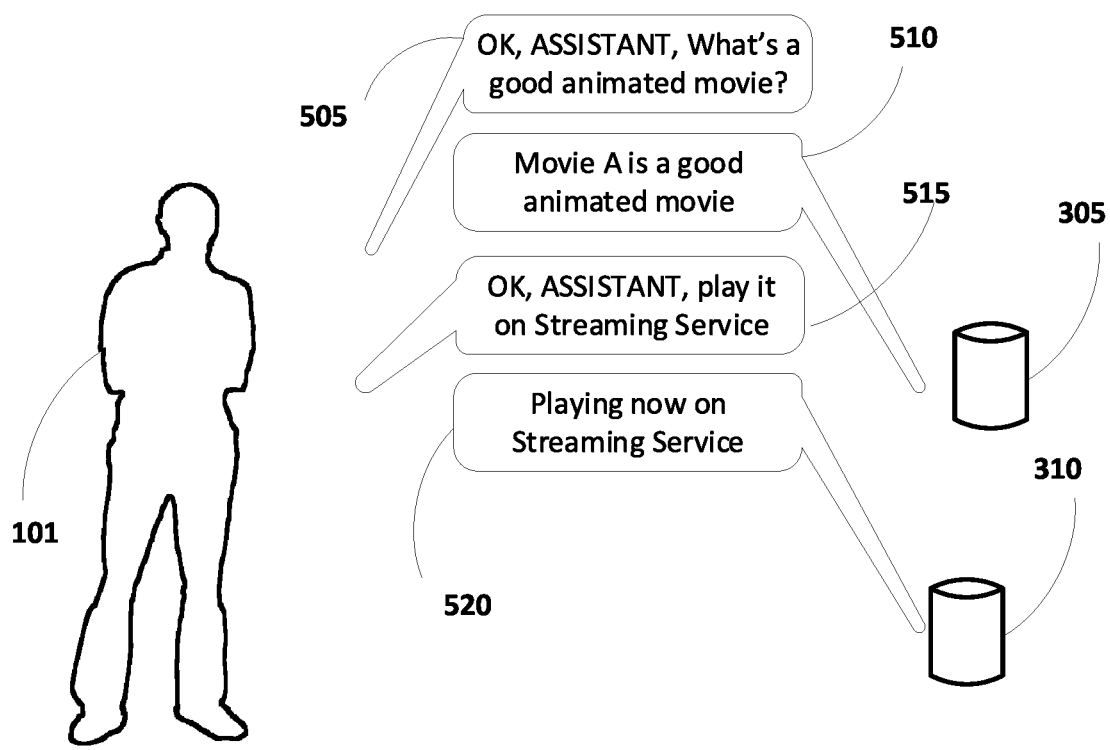
FIG. 5A, FIG. 5B, and FIG. 5C depict dialogs that include a user, a first automated assistant, and a second automated assistant according to various implementations disclosed herein.

As an example, referring to FIG. 5A, a dialog between a user 101 and two automated assistants 305 and 310 is illustrated. The illustrated dialog does not include a suggestion to transfer. Initially, the dialog occurs between the user and initially invoked automated assistant 305. The dialog starts with the user requesting "OK Assistant, What's a good animated movie?" 505, to which the initially invoked automated assistant 305 responds with "Movie A is a good animated movie" 510. In this instance, the request can be handled by the initially invoked automated assistant 305.

Next, the user requests "OK Assistant, play it on Streaming Service" 515. Initially invoked automated assistant 305 can determine that it is not configured to access and/or utilize "Streaming Service" and further determine that subsequently invoked automated assistant 310 can handle the request (e.g., is configured to communicate with "Streaming Service"). Initially invoked automated assistant 305 can invoke subsequently invoked automated assistant 310 and provide dialog data that can allow subsequently invoked automated assistant 310 to perform an action of playing "Movie A" on "Streaming Service." For example, initially invoked automated assistant 305 can provide audio data of the dialog (e.g., dialog portions 505, 510, and/or 515), textual representations of the dialog, and/or other representations of the intent of the dialog between the user 101 and the initially invoked automated assistant 305. In response, subsequently invoked automated assistant 310 provides synthesized speech output of "Playing now on Streaming Service" 520, as well as playing Movie A on Streaming Service. In this instance, the request to transfer can include the user previously indicating, via one or more user preferences and/or past behavior, that "Streaming Service" queries be handled by subsequently invoked automated assistant 310.

Figure 5B:
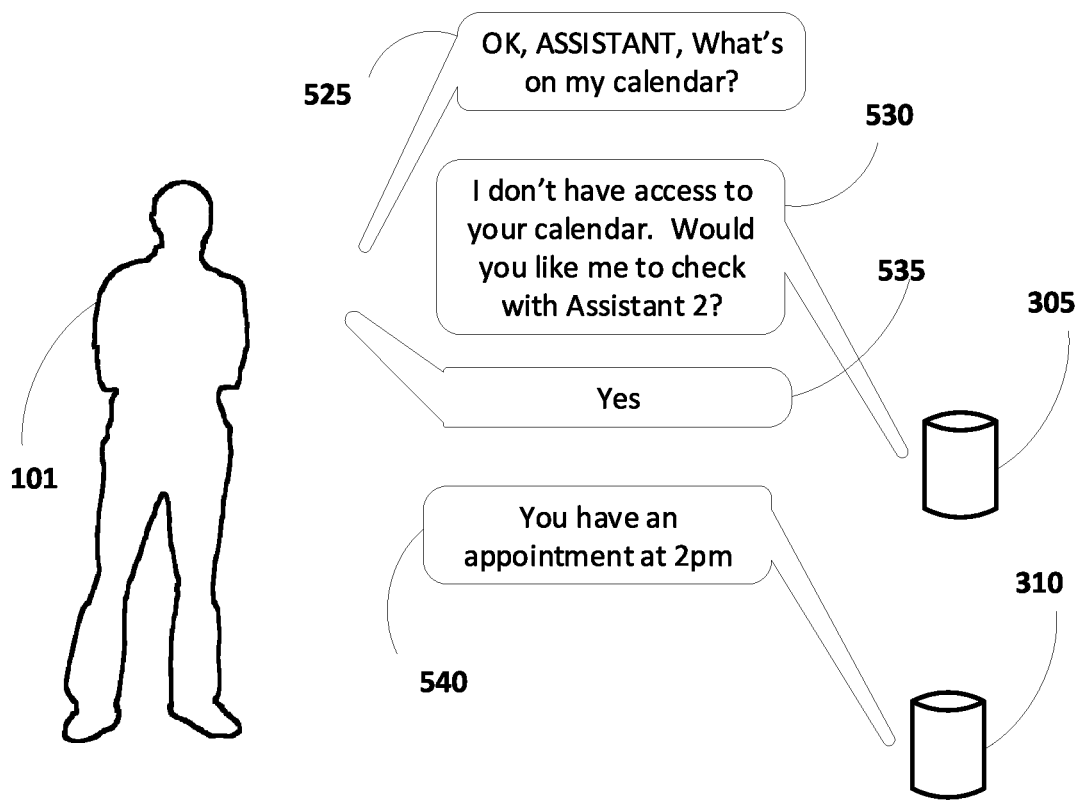

As another example, referring to FIG. 5B, a dialog between a user 101 and two automated assistants 305 and 310 is illustrated. In this illustrated dialog, the user 101 is provided with a suggestion to transfer at least a portion of the dialog with the initially invoked automated assistant 305 to the subsequently invoked automated assistant 310. Initially, the dialog occurs between the user 101 and initially invoked automated assistant 305. The dialog starts with the user requesting "OK Assistant, What's on my calendar?" 525. The initially invoked automated assistant 305 may not have access to the calendar application of the user and may determine, based on indications provided by other automated assistants, as described herein, that automated assistant 310 has access to a calendar application of the user. Initially invoked automated assistant 305 responds with "I don't have access to your calendar. Would you like me to check with Assistant 2?" 530. This response includes an explicit suggestion to the user 101 to transfer the dialog to "Assistant 2," a reference to subsequently invoked automated assistant 310. The user 101 responds with "Yes" 535, and initially invoked automated assistant 305 can invoke assistant 310, as described previously, and further transfer all or a portion of the previous dialog (or data indicative of the dialog) to subsequently invoked automated assistant 310. Subsequently invoked automated assistant 310, which has access to a calendar application of the user, can continue the dialog by responding with information from the user's calendar 540.

Referring to FIG. 4B, a diagram is provided that illustrates the flow of data between a user 101, an initially invoked automated assistant 305, and a subsequently invoked automated assistant 310. Initially, a dialog 445 can occur between the user 101 and the initially invoked automated assistant 305. For example, the user may utter one or more phrases that invokes initially invoked automated assistant 305, such as "OK Assistant A." The phrase can be a phrase that only invokes initially invoked automated assistant 305 and not subsequently invoked automated assistant 310. The dialog may continue between the initially invoked automated assistant 305 and the user 101, such as "What is a good movie to watch?" from user 101, followed by a response of "Movie A is a good movie to watch" from initially invoked automated assistant 305.

At some point in the dialog with initially invoked automated assistant 305, the user may invoke subsequently invoked automated assistant 310 by uttering a hotword that is unique to subsequently invoked automated assistant 310, such as "OK Assistant B." The hotword can be followed with dialog 450 that is directed to subsequently invoked automated assistant 310, such as "OK Assistant B, play it on Streaming Service." Thus, in this instance, the user 101 has explicitly invoked automated assistant 310 and started a dialog directly with the assistant 310.

In some instances, subsequently invoked automated assistant 310 may require information regarding previous dialog with initially invoked automated assistant 305 in order to determine an intent and/or context for a request. For example, in dialog 445, the user may utter "What's a good movie," to which the initially invoked automated assistant 305 may respond with "Movie A is a good movie." The user 101 may then utter "OK Assistant B, play it on Streaming Service" as additional dialog 450. Subsequently invoked automated assistant 310, once invoked, can then process the utterance of the user 101. However, at that point, subsequently invoked automated assistant 310 may not have the context to resolve the meaning of "it" in the user request. Thus, initially invoked automated assistant can provide dialog data 465 to subsequently invoked automated assistant 310 to determine context and/or intent in the dialog 450.

In some implementations, when a subsequently invoked automated assistant 310 has been invoked and processes an utterance of the user 101, verification module 395 can verify that the speaker of the utterance (i.e., user 101) has previously engaged in a dialog with initially invoked automated assistant 305. In some implementations, verification module 335 can provide speaker verification data 455 to verification module 395, which can then determine whether the speaker of the previous dialog with initially invoked automated assistant 305 is the same speaker as the speaker of the dialog 445. In some implementations, microphone 365 may generate audio data from utterances of the user during the previous dialog, and verification module 335 can process the audio data to verify that the dialog 445 (of which microphone 365 has captured) is the same as the speaker of dialog 450 (also captured by microphone 365). Thus, in some instances, the dialog data 445 has already been received by the subsequently invoked automated assistant 310 and does not require the dialog data to be provided by the initially invoked automated assistant 305.

Speaker verification data may include, for example, all or a portion of the dialog captured by microphone 365 of the subsequently invoked automated assistant 310, a voice profile of the speaker, and/or other data that can allow verification module 395 to verify that the speaker of the dialog 450 is the same speaker as the dialog 445. Once the speaker verification data 455 has been provided, initially invoked automated assistant 305 can determine whether the same speaker has engaged in a dialog with the initially invoked automated assistant 305. If initially invoked automated assistant 305 determines that a dialog with the user has occurred, initially invoked automated assistant 305 can provide a verification confirmation 460 to subsequently invoked automated assistant 310. The confirmation indicates that the speaker has previously engaged the initially invoked automated assistant 305 and the initially invoked automated assistant 305 can further provide dialog data 465 of the dialog that occurred between the user 101 and the initially invoked automated assistant 305. Thus, subsequently invoked automated assistant 310 can determine a context for the dialog and resolve any ambiguities in the dialog 450 that was previously captured by a microphone associated with the subsequently invoked automated assistant 310. Subsequently invoked automated assistant 310 may then perform one or more actions 470 in response to the dialog 450, such as access an application and/or provide synthesized speech as a response.

Figure 5C:
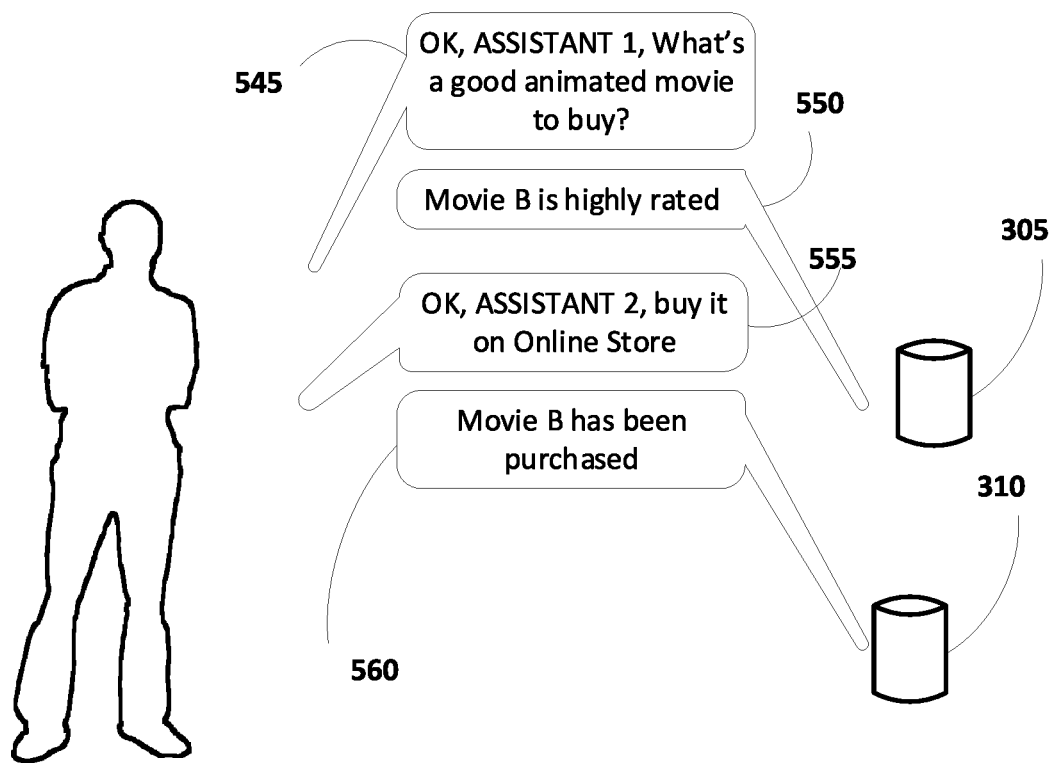

As an example, referring to FIG. 5C, a dialog is illustrated between a user 101, an initially invoked automated assistant 305, and a subsequently invoked automated assistant 310. The user 101 provides a spoken utterance of "OK Assistant 1, What's a good animated movie to buy?" 545, which is directed to initially invoked automated assistant 305. Initially invoked automated assistant 305 responds to the utterance with "Movie B is highly rated" 550. In response, user 101 provides the utterance "OK Assistant 2, buy it on Online Store" 555, which is directed to subsequently invoked automated assistant 310 and captured by one or more microphones of the client device executing subsequently invoked automated assistant 310. Subsequently invoked automated assistant 310 can provide, to initially invoked automated assistant 305, speaker verification data of the user uttering utterance 555 such that initially invoked automated assistant 305 can verify that utterance 555 was provided by the same user as utterance 545. In some implementations, once the same speaker has been verified, subsequently invoked automated assistant 310 can be provided with the previous dialog data (e.g., utterance 545). In some implementations, subsequently invoked automated assistant 310 may have captured the utterance 545 via one or more microphones of a client device executing the assistant and thus already have the previous dialog data. For example, in some implementations, subsequently invoked automated assistant 310 may capture limited audio continuously and, once invoked, utilize previously captured audio that was directed to initially invoked automated assistant 305 after verifying that the speaker is the same in both instances.

Figure 6:
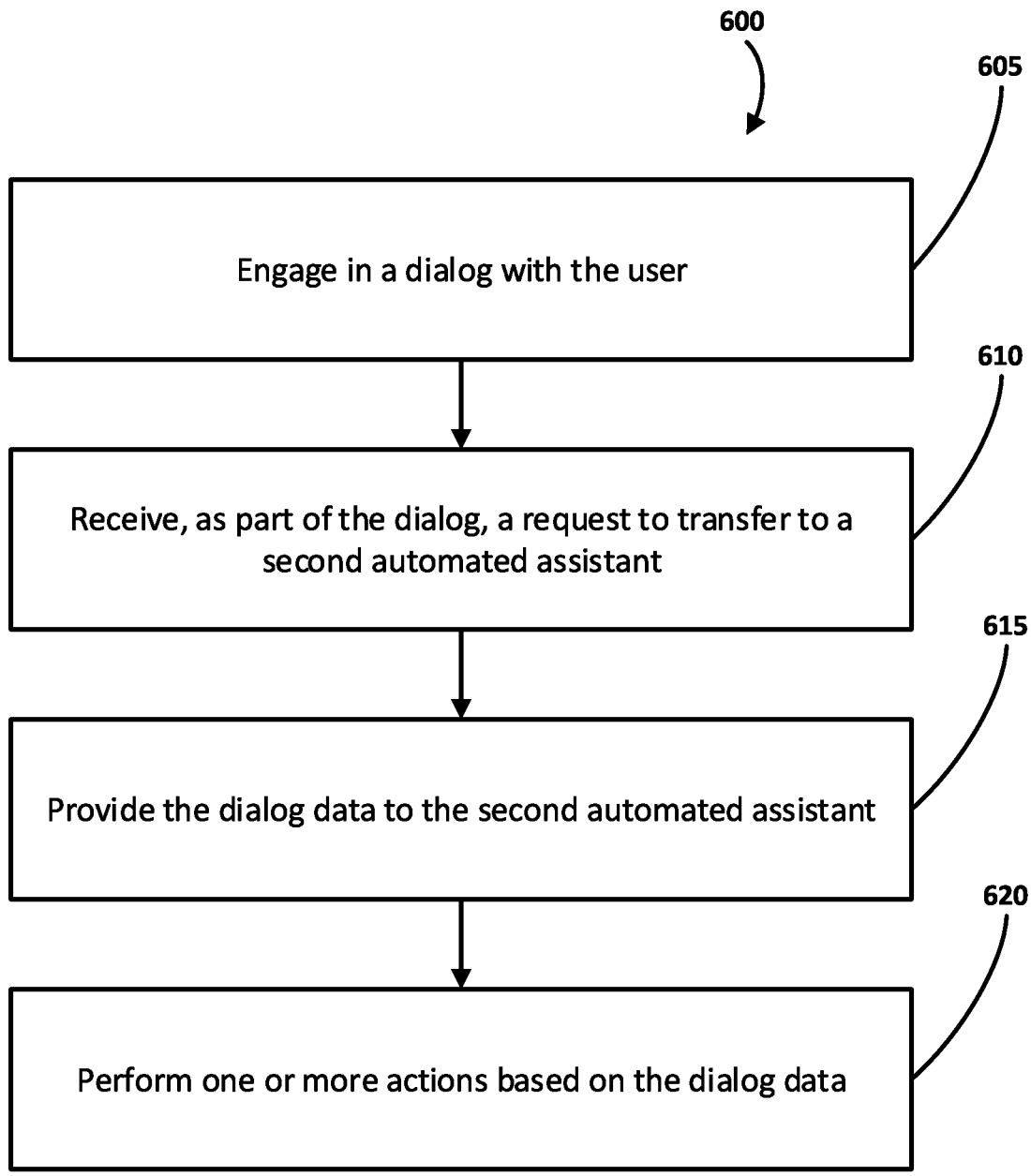
FIG. 6, FIG. 7, and FIG. 8 depict flowcharts, each illustrating an example method according to various implementations disclosed herein.

FIG. 6 depicts a flowchart illustrating an example method 600 for processing a dialog with a first automated assistant and providing the dialog data to a second automated assistant. For convenience, the operations of the method 600 are described with reference to a system that performs the operations. This system of method 600 includes one or more processors and/or other component(s) of a client device. Moreover, while operations of the method 600 are shown in a particular order, this is not meant to be limiting. One or more operations may be reordered, omitted, or added.

At step 605, an initially invoked automated assistant engages in a dialog with a user. The initially invoked automated assistant may be invoked by one or more hotwords uttered by the user and processed by invocation engine 315. Once invoked, query processing engine 330 can process utterances of the user and determine one or more actions to perform in response to the user utterances. For example, initially invoked automated assistant 305 can be invoked with a phrase "OK Assistant A," followed by the query "What's a good animated movie." Query processing engine 330 can determine a response of "Movie A is a good movie," which can be provided via synthesized speech to the user. A dialog can continue between the user and initially invoked automated assistant 305 such that the user can provide additional utterances, either related to previous utterances (and/or related to responses from initially invoked automated assistant 305) or unrelated utterances.

At step 610, the initially invoked automated assistant receives a request to transfer a portion of the dialog to a second automated assistant. A component that shares one or more characteristics with assistant coordination module 325 can determine whether another automated assistant, such as subsequently invoked automated assistant 310, is configured to process the dialog data. For example, assistant coordination module 375 can provide an indication, such as an audible signal via speaker 370 and/or an indication via API 345 and 390, that may be received by initially invoked automated assistant 305, indicating the types of queries that can be handled by subsequently invoked automated assistant 310. As an example, subsequently invoked automated assistant 310 may be configured to communicate with a calendar application of the user, and can provide an ultrasonic signal that can be received by microphone 320 to indicate to initially invoked automated assistant 305 that queries that are related to the user's calendar application can be handled by subsequently invoked automated assistant 310.

In some implementations, the user may request to transfer dialog data to a subsequently invoked automated assistant. In some instances, the user may explicitly request that a dialog that was initiated with the initially invoked automated assistant be continued with a second automated assistant. For example, the user may utter "OK Assistant 1, Play Song on Assistant 2." In some instances, the user may utter a query that cannot be processed by the initially invoked automated assistant. For example, in a dialog with initially invoked automated assistant, the user may utter "OK Assistant, buy Movie 1 on Online Store," which can be a request to transfer to a different automated assistant that can fulfill the request.

In some implementations, the request to transfer may be provided by the user in response to a suggestion to transfer from the initially invoked automated assistant. For example, the user may utter "OK Assistant 1, what's on my calendar," and the initially invoked automated assistant may not be configured to fulfill the request. The initially invoked automated assistant can respond with "I can't access your calendar, would you like me to ask Assistant 2." The user may then utter a request to transfer, such as "Yes," and initially invoked automated assistant 305 can invoke the subsequently invoked automated assistant 310 to transfer the dialog data.

In some implementations, a subsequently invoked automated assistant 310 may request the transfer of dialog data. For example, in some instances, a user 101 may invoke an initially invoked automated assistant 305 and engage in a dialog, such as the dialog illustrated in FIG. 5C. At some point in the dialog, the user stops interacting with the initially invoked automated assistant 305 and instead invokes the subsequently invoked automated assistant with dialog 555 (i.e., "OK Assistant 2, buy it on Online Store."). At this point, subsequently invoked automated assistant 310 may not have access to the previous dialog because, while dialog turns 545 and 550 were occurring, subsequently invoked automated assistant 310 was not invoked. In those instances, subsequently invoked automated assistant 310 can submit, to initially invoked automated assistant 305, a request to transfer the dialog (or data indicative of the dialog) to the subsequently invoked automated assistant 310.

In some implementations, subsequently invoked automated assistant 310 can provide, with a request to transfer the dialog data, voice verification data to the initially invoked automated assistant 305 to verify that the speaker of the dialog that with the initially invoked automated assistant 305 is the same speaker as the speaker that invoked (and subsequently interacted with) the subsequently invoked automated assistant 310. For example, referring to FIG. 3, verification module 335 can provide, via one or more communications channels, data indicative of the speaker of the invocation and/or utterance to the subsequently invoked automated assistant 310. Verification module 395 can determine based on, for example, voice profile data and/or the audio data of the utterance directed to subsequently invoked automated assistant 310, that the speaker of the previous dialog is the same user 101 as the subsequent utterance. Upon verification, at step 615, dialog data is provided to the second (or subsequently invoked) automated assistant 310 by the initially invoked automated assistant 305.

In some implementations, the dialog data may be the audio data of the previous dialog, to which query processing engine 340 can determine an intent and/or context for the subsequent utterance. In some implementations, intent and/or context may be determined by query processing engine 330 of the initially invoked automated assistant 305 and the intent and/or context may be provided to subsequently invoked automated assistant 310 as dialog data. In those implementations, query processing engine 340 can determine one or more actions to perform based on the subsequent utterance and the previous dialog.

At step 620, the second automated assistant performs one or more actions in response to being provided with the dialog data. Actions may include, for example, the subsequently invoked automated assistant fulfilling a request and/or providing a response based on the utterance that is resolved based on the intent and/or context of the previous dialog. In some implementations, an action may include the subsequently invoked automated assistant interacting with one or more other applications. For example, referring again to the dialog of FIG. 5C, the action performed by the subsequently invoked automated assistant 310 can include interacting with an Online Store application and/or website. Other actions may include the subsequently invoked automated assistant 310 responding with a response that it is configured to fulfill, interactions with a calendar application, interactions with a Streaming Service, and/or interactions with other applications.

Figure 7:
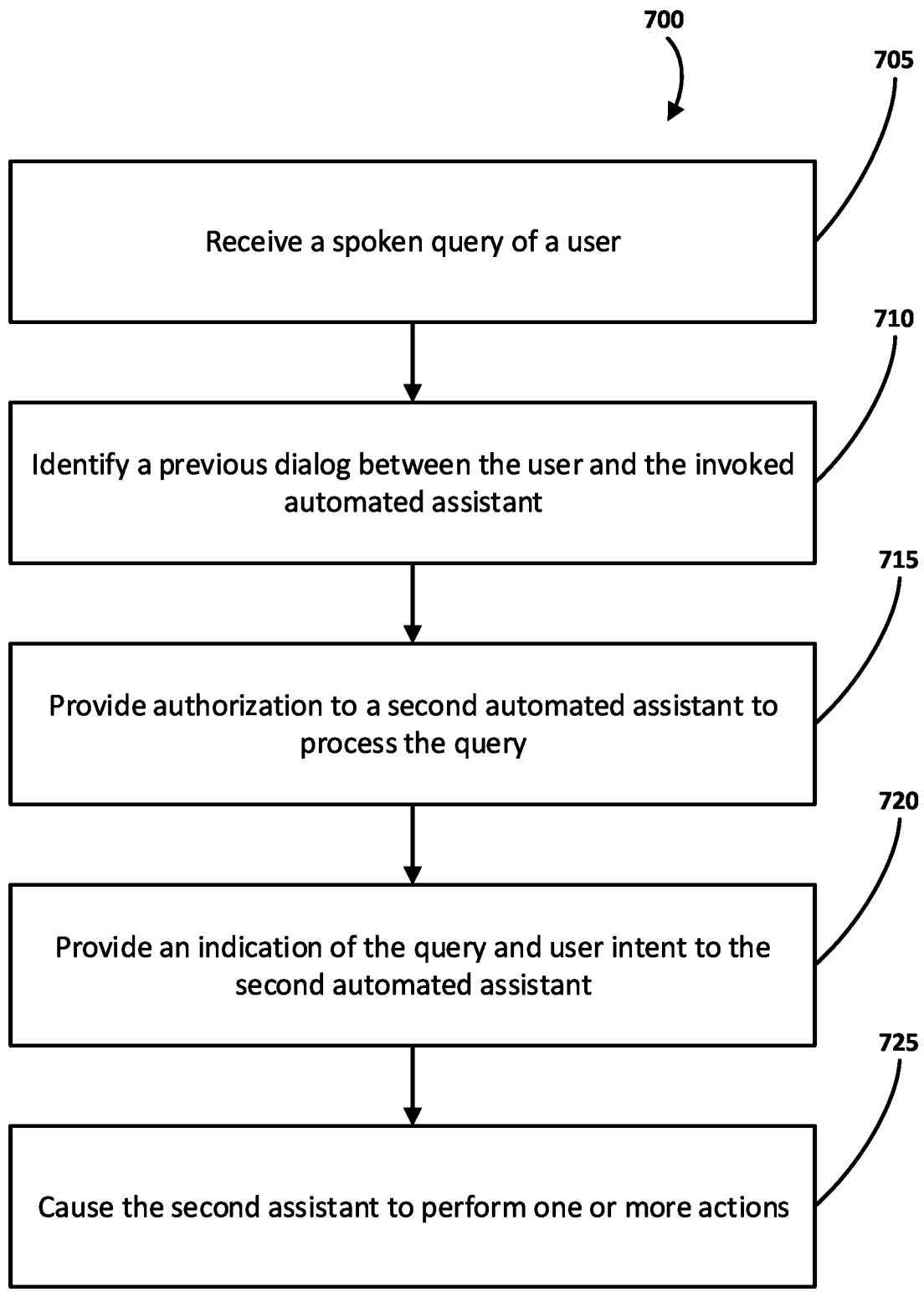

FIG. 7 depicts a flowchart illustrating an example method 700 for providing authorization to a second automated assistant to process dialog data from a dialog between a user and an initially invoked automated assistant. At step 705, a spoken query is received by a first automated assistant. The first automated assistant can share one or more characteristics with initially invoked automated assistant 305. In some implementations, step 705 can share one or more characteristics with step 605 of FIG. 6.

At step 710, the first automated assistant identifies a previous dialog between the user and the first (invoked) automated assistant. The dialog can include one or more utterances of the user and one or more responses of the first automated assistant. For example, referring to FIG. 5B, the previous dialog can include the user uttering utterance 525, along with the response 530 of the first automated assistant 305. Previous dialog data can be determined by a component that shares one or more characteristics with query processing engine 330.

At step 715, authorization of a second automated assistant can be provided to the first automated assistant 305. For example, authorization can include the utterance 535 of the user 101, which is included in the suggestion to transfer 530. Also, for example and referring to FIG. 5A, the authorization to transfer can be implied by an utterance of the user 101, such as utterance 515 that indicates an authorization by the user 101 to continue the same dialog with a second automated assistant 310.

At step 720, an indication of the query is provided to the second automated assistant. In some implementations, step 720 can share one or more characteristics with step 615 of FIG. 6. For example, the indication can include the dialog that previously occurred between the first automated assistant and the user, and intent and/or context of the dialog, and/or other data that allows the second automated assistant to resolve one or more intents and/or determine context for the subsequent utterance directed to the second automated assistant.

At step 725, one or more actions can be performed by the second automated assistant in response to the utterance of the user that is directed to the second automated assistant. Step 725 can share one or more characteristics with step 620 of FIG. 6. For example, one or more actions can include the second automated assistant providing a response to which it is configured to respond and/or interacting with one or more applications.

Figure 8:
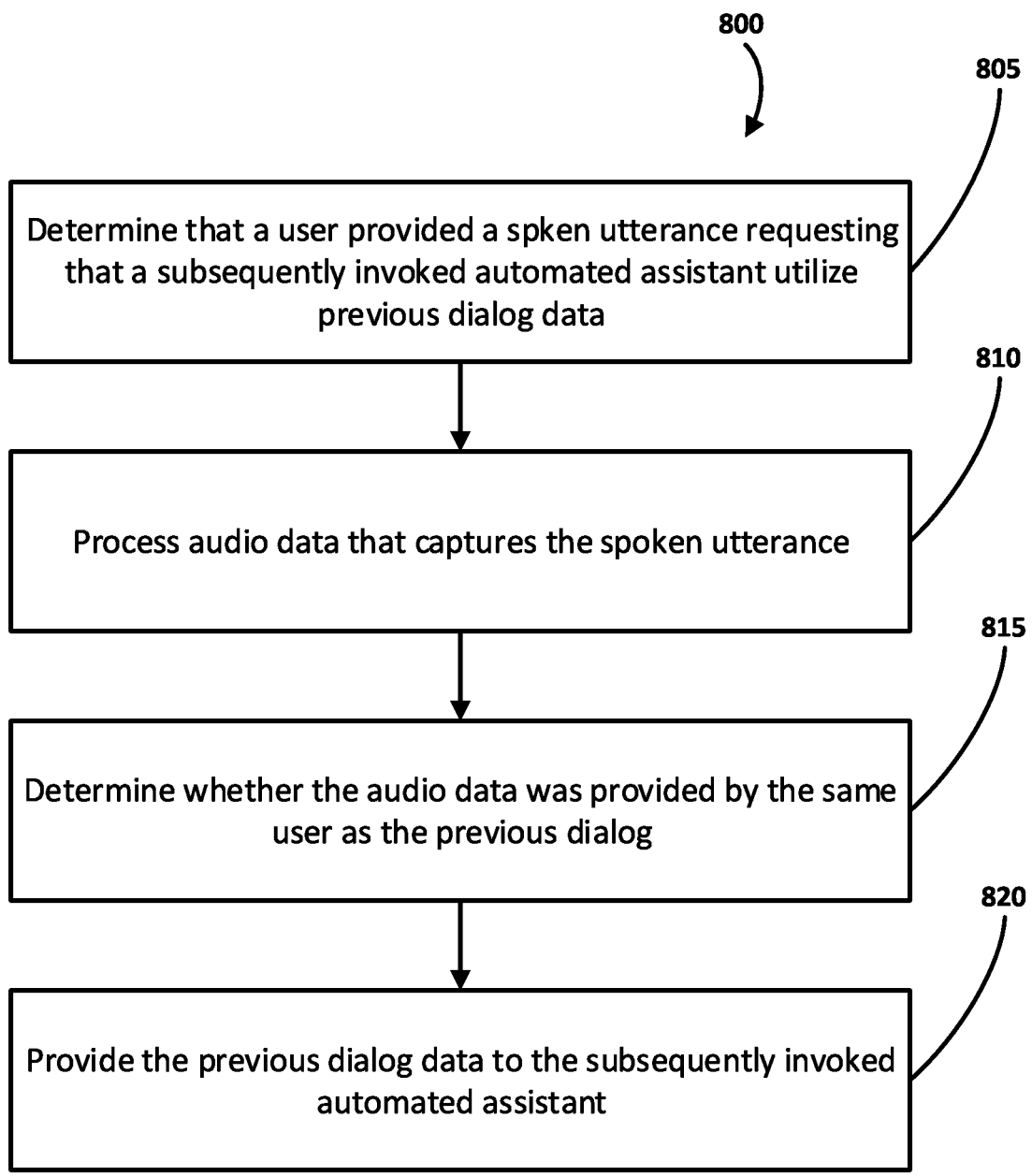

FIG. 8 depicts a flowchart illustrating an example method 800 for verifying that a speaker of a dialog with an initially invoked automated assistant is the same as the speaker of a request for processing of the dialog data by a subsequently invoked automated assistant.

At step 805, a user that provided a spoken utterance requesting that a subsequently invoked automated assistant utilize previous dialog data is determined. For example, referring to FIG. 5C, utterance 555 is an utterance that invokes automated assistant 310 and requests that the dialog data be transferred to the subsequently invoked automated assistant 310. In some implementations, the request to transfer the dialog data may be directed to the first automated assistant 305, such as "OK Assistant, see if Assistant 2 can handle this request." In some implementations, the request to transfer the dialog data may be directed to the subsequently invoked automated assistant 310, as illustrated in FIG. 5C. In some implementations, the request by the user may be in response to a suggestion to transfer the dialog data, as illustrated in FIG. 5B.

At step 810, audio data that captures the spoken utterance is determined. The audio data can be captured by a component that shares one or more characteristics with microphone 365 and/or microphone 320. For example, microphone 320 may capture the spoken utterance and assistant coordination module 325 can transfer the audio data to subsequently invoked automated assistant 310. Also, for example, microphone 365 can capture the audio data directly, which can, in addition to being a request to transfer, can invoke the subsequently invoked automated assistant 310 via invocation engine 385.

At step 815, one or more components determine whether the audio data was provided by the same user as the previous dialog. The one or more components can share one or more characteristics with verification module 335 and/or verification module 395. For example, the audio data can be captured by microphone 365, sent to initially invoked automated assistant 305, and verification module 395 can determine whether the audio data was provided by the same user as the previous dialog. Also, for example, initially invoked automated assistant 305 can provide subsequently invoked automated assistant 310 with verification data and verification module 335 can determine whether the speaker of the spoken utterance (captured by microphone 365) is the same speaker as the previous dialog.

At step 820, the previous dialog data is provided to the subsequently invoked automated assistant. The previous dialog data can include audio data of the previous dialog, intent and/or context of the previous dialog, and/or other data that can be utilized by subsequently invoked automated assistant to determine an intent and/or context for subsequent utterances of the user. In some implementations, wherein the verification of step 815 indicates that the speaker is not the same as the previous dialog, one or more components may prevent the dialog data from being transferred to the subsequently invoked automated assistant 315.

Figure 9:
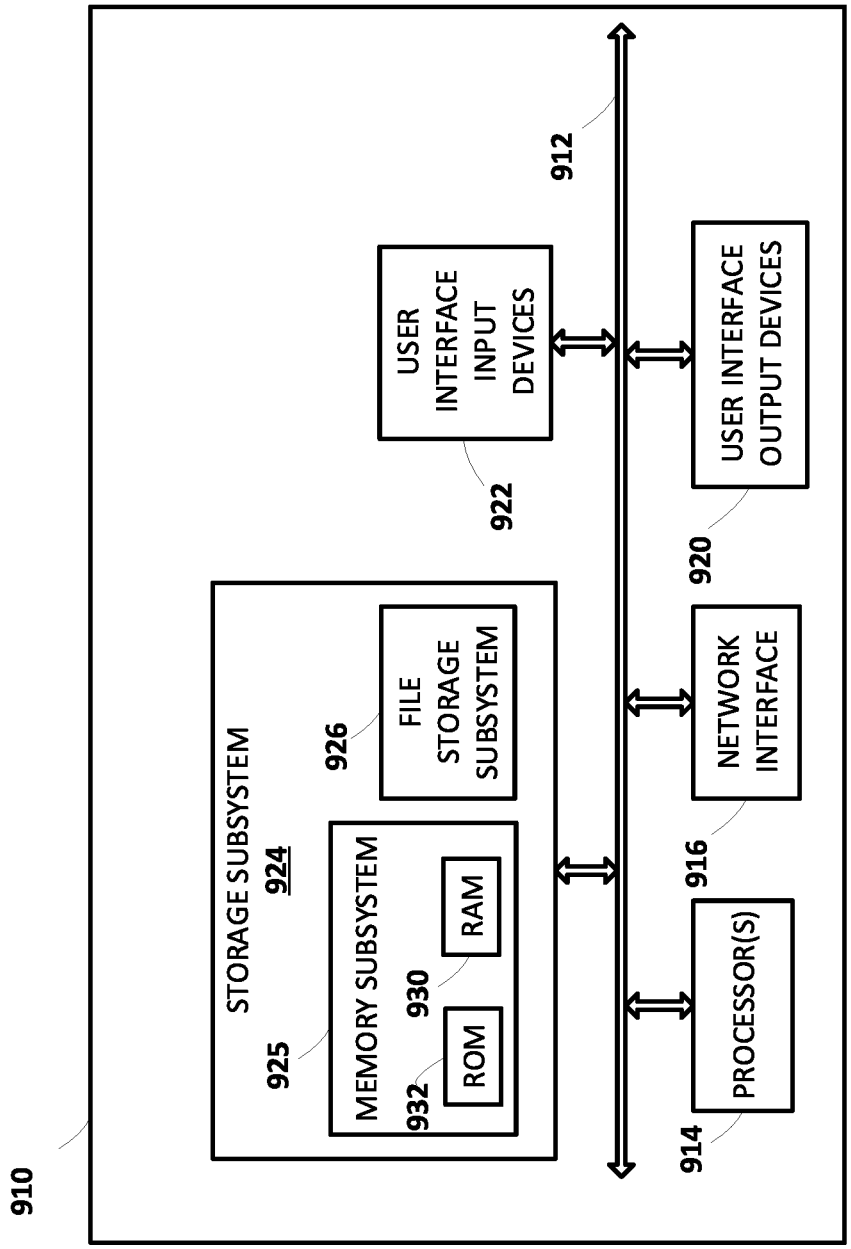
FIG. 9 illustrates an example architecture of a computing device.

FIG. 9 is a block diagram of an example computing device 910 that may optionally be utilized to perform one or more aspects of techniques described herein. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the methods of FIGS. 6-8, and/or to implement various components depicted in FIGS. 2-4.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In some implementations, a method implemented by one or more processors is provided and includes, during a dialog between a user and an initially invoked automated assistant: receiving, by the initially invoked automated assistant and via a first automated assistant interface of a first client device in an environment with a user, a spoken utterance of the user that is directed to the initially invoked automated assistant as part of the dialog, processing, by the initially invoked automated assistant, the spoken utterance to generate a response to the spoken utterance, causing, by the initially invoked automated assistant, a response to the spoken utterance to be rendered by the first client device as part of the dialog, and receiving, by the initially invoked automated assistant and after causing the response to be rendered, a request to transfer, to a second automated assistant, dialog data generated by the first automated assistant as part of the dialog. In response to receiving the request, the method further includes providing, by the first automated assistant and via a communication channel with the second automated assistant, the dialog data to the second automated assistant, wherein providing the dialog data causes the second automated assistant to perform one or more actions based on the dialog data.

These and other implementations of the technology disclosed herein can include one or more of the following features.

In some implementations, the request to transfer is an additional spoken utterance of the user directed to the initially invoked automated assistant.

In some implementations, the request to transfer is a request, from the second automated assistant, to process the spoken utterance. In some of those implementations, the request to transfer includes audio data indicative of the spoken utterance. In some of those implementations, the method further includes verifying, by the initially invoked automated assistant, based on processing the audio data using a speaker verification model, that the user is a speaker indicated by the audio data, wherein providing the dialog data to the second automated assistant is contingent on verifying that the user is the speaker indicated by the audio data.

In some implementations, the second automated assistant is operating on a second device separate from the first device, and wherein the one or more actions includes generating second assistant audio output that is provided to the user via the second client device.

In some implementations, the request to process includes an indication of the one or more actions to be performed by the second automated assistant, and wherein the initially invoked assistant is unable to perform the one or more actions.

In some implementations, another method implemented by one or more processors is provided and includes receiving, by an initially invoked automated assistant client of an initially invoked automated assistant, a spoken query of a user that is captured in audio data generated by one or more microphones of a first client device in an environment of the user, the first automated assistant client being installed on the first client device, identifying, based on a previous dialog between the user and the initially invoked automated assistant indicated by the audio data, user intent indicated by one or more terms of the dialog, providing authorization, to a second automated assistant client installed on a second client device in the environment, to process the query based on the user intent, and providing, by the initially invoked automated assistant client and via a communication channel with the second automated assistant client, an indication of the query and the user intent to the second automated assistant client, wherein providing the indication and the user intent causes the second automated assistant client to perform one or more actions.

These and other implementations of the technology disclosed herein can include one or more of the following features.

In some implementations, the communication channel comprises an ultrasonic communication channel, and the step of providing the indication of the query and the user intent to the second automated assistant client comprises causing an ultrasonic signal, that incorporates the indication of the query and the user intent, to be rendered via one or more speakers of the first client device.

In some implementations, the method further includes receiving, from the user, a second spoken query requesting the second automated assistant client to process the query, wherein providing the authorization is in response to receiving the second spoken query.

In some implementations, the method further includes determining that the first automated assistant is unable to process the user intent, providing a suggestion to the user to provide the authorization, and receiving the authorization from the user, wherein the authorization is provided to the second automated assistant client in response to receiving the authorization from the user.

In some implementations, the method further includes performing automatic speech recognition on the audio data that captures the spoken query to generate a text query, wherein the indication of the query is the text query.

In some implementations, another method implemented by one or more processors is provided and includes determining, at an initially invoked automated assistant, that a user provided a spoken utterance requesting that a subsequently invoked automated assistant utilize dialog data from a previous dialog of the user with the initially invoked automated assistant. In response to determining that the user provided the spoken utterance, the method further includes processing, by the initially invoked automated assistant, audio data that captures the spoken utterance, and determining, by the initially invoked automated assistant and based on the processing, whether the audio data was provided by a same user that engaged in the previous dialog. When it is determined that the user is the same user, the method further includes providing the previous dialog data to the subsequently invoked automated assistant. When it is determined that the user is not the same user, the method includes preventing providing the dialog data.

These and other implementations of the technology disclosed herein can include one or more of the following features.

In some implementations, the audio data is captured by a microphone of a first device executing the initially invoked automated assistant.

In some implementations, the audio data is captured by a microphone of a second device executing the subsequently invoked automated assistant.

In some implementations, the spoken utterance is directed to the initially invoked automated assistant.

In some implementations, the spoken utterance is directed to the subsequently invoked automated assistant.

In some implementations, the previous dialog data is provided via a non-human audible signal that is generated by a speaker of a first client device executing the initially invoked automated assistant and received by one or more microphones of a second client device executing the subsequently invoked automated assistant.

In some implementations, the previous dialog data is provided via an application programming interface between the initially invoked automated assistant and the subsequently invoked automated assistant.

In some implementations, the previous dialog data includes a textual representation of a dialog between the user and the initially invoked automated assistant.

In some implementations, the previous dialog data includes audio data that captures a dialog between the user and the initially invoked automated assistant.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method implemented by one or more processors, the method comprising:
   during a dialog between a user and an initially invoked automated assistant:
      receiving, by the initially invoked automated assistant and via a first automated assistant interface of a client device in an environment with a user, a spoken utterance of the user that is directed to the initially invoked automated assistant as part of the dialog;
      processing, by the initially invoked automated assistant, the spoken utterance to generate a response to the spoken utterance;
      causing, by the initially invoked automated assistant, a response to the spoken utterance to be rendered by the client device as part of the dialog;
      receiving, by the initially invoked automated assistant and after causing the response to be rendered, a request to transfer, to a subsequently invoked automated assistant, dialog data generated by the first automated assistant as part of the dialog, wherein the request to transfer is a request, to process the spoken utterance, that is from the subsequently invoked automated assistant to the initially invoked automated assistant and that is provided by the subsequently invoked automated assistant based on a user initiated invocation of the subsequently invoked automated assistant;
   in response to receiving the request:
      providing, by the initially invoked automated assistant and via a communication channel with the subsequently invoked automated assistant, the dialog data to the subsequently invoked automated assistant,
         wherein providing the dialog data causes the subsequently invoked automated assistant to perform one or more actions based on the dialog data.

2. The method of claim 1, wherein the request to transfer is an additional spoken utterance of the user directed to the initially invoked automated assistant.

3. The method of claim 1, wherein the subsequently invoked automated assistant is operating on another client device separate from the first device, and wherein the one or more actions includes generating subsequently invoked assistant audio output that is provided to the user via the other client device.

4. The method of claim 1, wherein the request to process includes an indication of the one or more actions to be performed by the subsequently invoked automated assistant, and wherein the initially invoked assistant is unable to perform the one or more actions.

5. The method of claim 1, wherein the request to transfer includes audio data indicative of the spoken utterance.

6. The method of claim 5, further comprising:
verifying, by the initially invoked automated assistant, based on processing the audio data using a speaker verification model, that the user is a speaker indicated by the audio data;
wherein providing the dialog data to the subsequently invoked automated assistant is contingent on verifying that the user is the speaker indicated by the audio data.

7. A computer implemented method, comprising:
receiving, by an initially invoked automated assistant client of an initially invoked automated assistant, a spoken query of a user that is captured in audio data generated by one or more microphones of a first client device in an environment of the user, the first automated assistant client being installed on the first client device;
identifying, based on a previous dialog between the user and the initially invoked automated assistant indicated by the audio data, user intent indicated by one or more terms of the dialog;
receiving, by the initially invoked automated assistant from a second automated assistant on a second client device in the environment, an indication that the second automated assistant can fulfill the user intent indicated by one or more of the terms of the dialog;
providing authorization, to a second automated assistant client of the second automated assistant installed on the second client device in the environment, to process the query based on the user intent, wherein providing the authorization to the second automated assistant client is based on the indication that the second automated assistant can fulfill the user intent indicated by one or more of the terms of the dialog; and
providing, by the initially invoked automated assistant client and via a communication channel with the second automated assistant client, an indication of the query and the user intent to the second automated assistant client,
wherein providing the indication and the user intent causes the second automated assistant client to perform one or more actions.

8. The method of claim 7, wherein the communication channel comprises an ultrasonic communication channel and wherein providing the indication of the query and the user intent to the second automated assistant client comprises:
causing an ultrasonic signal, that incorporates the indication of the query and the user intent, to be rendered via one or more speakers of the first client device.

9. The method of claim 7, further comprising:
receiving, from the user, a second spoken query requesting the second automated assistant client to process the query, wherein providing the authorization is in response to receiving the second spoken query.

10. The method of claim 7, further comprising:
determining that the first automated assistant is unable to process the user intent;
providing a suggestion to the user to provide the authorization; and
receiving the authorization from the user, wherein the authorization is provided to the second automated assistant client in response to receiving the authorization from the user.

11. The method of claim 7, further comprising:
performing automatic speech recognition on the audio data that captures the spoken query to generate a text query, wherein the indication of the query is the text query.

12. A computer implemented method, comprising:
determining, at an initially invoked automated assistant, that a user provided a spoken utterance requesting that a subsequently invoked automated assistant utilize dialog data from a previous dialog of the user with the initially invoked automated assistant;
in response to determining that the user provided the spoken utterance:
processing, by the initially invoked automated assistant, audio data that captures the spoken utterance;
determining, by the initially invoked automated assistant and based on the processing, whether the audio data, that captures the spoken utterance requesting that the subsequently invoked automated assistant utilize the dialog data from the previous dialog of the user with the initially invoked automated assistant, was provided by a same user that engaged in the previous dialog; and
when it is determined that the user is the same user:
providing the previous dialog data to the subsequently invoked automated assistant; and
when it is determined that the user is not the same user:
preventing providing the dialog data.

13. The method of claim 12, wherein the audio data is captured by a microphone of a first device executing the initially invoked automated assistant.

14. The method of claim 12, wherein the audio data is captured by a microphone of a second device executing the subsequently invoked automated assistant.

15. The method of claim 12, wherein the spoken utterance is directed to the initially invoked automated assistant.

16. The method of claim 12, wherein the spoken utterance is directed to the subsequently invoked automated assistant.

17. The method of claim 12, wherein the previous dialog data is provided via a non-human audible signal that is generated by a speaker of a first client device executing the initially invoked automated assistant and received by one or more microphones of a second client device executing the subsequently invoked automated assistant.

18. The method of claim 12, wherein the previous dialog data is provided via an application programming interface between the initially invoked automated assistant and the subsequently invoked automated assistant.

19. The method of claim 12, wherein the previous dialog data includes a textual representation of a dialog between the user and the initially invoked automated assistant.

* * * * *